United States Patent
Koh et al.

(10) Patent No.: US 10,926,666 B2
(45) Date of Patent: Feb. 23, 2021

(54) APPARATUS AND METHOD FOR CONTROLLING REAR-SEAT LEG SUPPORT OF VEHICLE SEAT

(71) Applicant: HYUNDAI DYMOS INCORPORATED, Seosan-si (KR)

(72) Inventors: Sang Kyung Koh, Yongin-si (KR); Jong In Shin, Hwaseong-si (KR); Sang June Lee, Hwaseong-si (KR); Seong Youn Jo, Seoul (KR)

(73) Assignee: HYUNDAI DYMOS INCORPORATED, Seosan-si (KR)

( * ) Notice: Subject to any disclaimer, the term of this patent is extended or adjusted under 35 U.S.C. 154(b) by 42 days.

(21) Appl. No.: 16/224,106

(22) Filed: Dec. 18, 2018

(65) Prior Publication Data

US 2019/0118676 A1     Apr. 25, 2019

Related U.S. Application Data

(63) Continuation of application No. PCT/KR2017/007048, filed on Jul. 3, 2017.

(30) Foreign Application Priority Data

Jul. 19, 2016 (KR) .......................... 10-2016-0091667

(51) Int. Cl.
*A47C 1/00* (2006.01)
*B60N 2/02* (2006.01)
(Continued)

(52) U.S. Cl.
CPC ............. *B60N 2/0252* (2013.01); *B60N 2/02* (2013.01); *B60N 2/07* (2013.01); *B60N 2/20* (2013.01);
(Continued)

(58) Field of Classification Search
CPC . B60N 2/995; B60N 2/02; B60N 2/62; B60N 2/0252
See application file for complete search history.

(56) References Cited

U.S. PATENT DOCUMENTS

| | | | |
|---|---|---|---|
| 6,227,489 B1 * | 5/2001 | Kitamoto | B64D 11/00 244/118.5 |
| 6,583,596 B2 * | 6/2003 | Nivet | B60N 2/0244 318/626 |

(Continued)

FOREIGN PATENT DOCUMENTS

| | | | |
|---|---|---|---|
| JP | 2005-518985 A | 6/2005 | |
| JP | 2012-162179 A | 8/2012 | |

(Continued)

OTHER PUBLICATIONS

International Search Report issued in corresponding International Application No. PCT/KR20171007048 dated Sep. 19, 2017, with translation (5 pages).

*Primary Examiner* — Shin H Kim
(74) *Attorney, Agent, or Firm* — Osha Bergman Watanabe & Burton LLP (57) ABSTRACT

An apparatus for controlling a rear-seat leg support for a vehicle seat includes: a rear-seat leg support disposed at a lower side of a vehicle seat and that performs an upward-downward rotational operation and a forward-rearward slide operation; a passenger seat that performs a forward-rearward slide operation and a forward-rearward reclining operation; a drive unit that operates each of the rear-seat leg support and the passenger seat; a sensor unit connected to the drive unit and that detects a rotation angle and a slide position of the rear-seat leg support or a slide position and a reclining angle of the passenger seat; an input unit that receives an inputted operation instruction to operate the rear-seat leg (Continued)

support or the passenger seat; and a control unit that adjusts the slide position of the rear-seat leg support.

5 Claims, 5 Drawing Sheets

(51) Int. Cl.
- *B60N 2/22* (2006.01)
- *B60N 2/07* (2006.01)
- *B60N 2/20* (2006.01)
- *B60N 2/62* (2006.01)

(52) U.S. Cl.
CPC ............... *B60N 2/22* (2013.01); *B60N 2/62* (2013.01); *B60N 2002/0272* (2013.01)

(56) References Cited

U.S. PATENT DOCUMENTS

| | | | | |
|---|---|---|---|---|
| 7,528,563 B2* | 5/2009 | Thoreux | ............... | B64D 11/06 318/466 |
| 7,546,215 B2* | 6/2009 | Muhammad | ........... | B64D 11/06 702/94 |
| 7,647,151 B2* | 1/2010 | Abt | ........................ | B64D 11/06 701/45 |
| 2002/0158497 A1* | 10/2002 | Nivet | ................... | B60N 2/0244 297/330 |
| 2008/0007101 A1* | 1/2008 | Abt | .................... | B64D 11/0643 297/240 |
| 2008/0009958 A1* | 1/2008 | Abt | ........................ | B64D 11/06 700/29 |
| 2014/0265479 A1* | 9/2014 | Bennett | .................. | B60N 2/919 297/217.4 |

FOREIGN PATENT DOCUMENTS

| | | |
|---|---|---|
| JP | 2015-209193 A | 11/2015 |
| KR | 1999-0025255 U | 7/1999 |
| KR | 200440263 Y1 | 6/2008 |
| KR | 101407261 B1 | 6/2014 |

* cited by examiner

APPARATUS AND METHOD FOR CONTROLLING REAR-SEAT LEG SUPPORT OF VEHICLE SEAT

TECHNICAL FIELD

The present invention relates to an apparatus and a method for controlling a rear-seat leg support for a vehicle seat, and more particularly, to an apparatus and a method for controlling a rear-seat leg support for a vehicle seat, which are capable of preventing damage to the rear-seat leg support caused by a user's carelessness by avoiding interference between a vehicle floor or a passenger seat and the rear-seat leg support installed on a rear seat in a vehicle.

BACKGROUND

Typically, a seat is provided in a vehicle so that an occupant may be comfortably seated in the vehicle, and the seat includes a seat cushion which supports the occupant's buttocks, and a seatback which supports the occupant's back and waist so that the occupant may lean his/her back and waist against the seatback.

Further, a leg support, which is configured to support the occupant's calves, is provided on the seat in order to provide comfort and convenience to the occupant, and the leg support supports the occupant's back, waist, buttocks, and legs when the occupant is seated in the seat, thereby enabling the occupant to take a rest comfortably.

A seat device is installed on a seat for a vehicle, and the seat device may move the seat cushion forward and rearward, adjust a height of the seat cushion, and adjust an angle of the seatback to any angle. As a result, the occupant may adjust a height of the seat and an inclination angle of the seat in accordance with his/her body condition.

The occupant seated in the seat tilts the seatback rearward and tilts the leg support to take a rest, but the leg support on the rear seat merely moves upward and downward. That is, the rear-seat leg support has no structure that operates in a multi-stage manner. Therefore, the rear-seat leg support is sometimes damaged due to the occupant's carelessness.

Meanwhile, a recliner for a passenger seat rotates the passenger seat based on a user's input. In this case, the rotation of the passenger seat by the recliner is performed regardless of a slide operation of the rear-seat leg support. By the way, when the passenger seat is rotated by the recliner in a situation in which a length of the rear-seat leg support is automatically adjusted by the slide operation of the rear-seat leg support, the rear-seat leg support is sometimes damaged. Accordingly, there is a need to avoid interference between the rear-seat leg support and the passenger seat.

SUMMARY

One or more embodiments of the present invention provide an apparatus and a method for controlling a rear-seat leg support for a vehicle seat, which are capable of preventing damage to the rear-seat leg support caused by a user's carelessness by avoiding interference between a vehicle floor or a passenger seat and the rear-seat leg support installed on a rear seat in a vehicle.

One or more embodiments of the present invention provide an apparatus for controlling a rear-seat leg support for a vehicle seat, the apparatus including: a rear-seat leg support which is provided at a lower side of a vehicle seat and performs an upward-downward rotational operation and a forward-rearward slide operation; a passenger seat which performs a forward-rearward slide operation and a forward-rearward reclining operation; a drive unit which operates each of the rear-seat leg support and the passenger seat; a sensor unit which is connected to the drive unit and detects a rotation angle and a slide position of the rear-seat leg support or a slide position and a reclining angle of the passenger seat; an input unit which receives an inputted operation instruction to operate the rear-seat leg support or the passenger seat from a user; and a control unit which controls the drive unit in accordance with the inputted operation instruction and adjusts the slide position of the rear-seat leg support based on the detected rotation angle of the rear-seat leg support.

The control unit may operate the slide position of the rear-seat leg support forward in a step-by-step manner when the detected rotation angle of the rear-seat leg support operates upward.

The control unit may individually operate an upward rotational operation and a slide operation of the rear-seat leg support when the detected rotation angle of the rear-seat leg support operates upward, and the control unit may operate a rearward slide operation in accordance with a predetermined floor interference condition when the detected rotation angle of the rear-seat leg support operates downward.

The control unit may adjust the rotation angle of the rear-seat leg support based on the detected reclining angle of the passenger seat when the detected position of the passenger seat is within a predetermined first section, and the control unit may perform the rotational operation of the rear-seat leg support in accordance with the inputted operation instruction when the detected position of the passenger seat is within a predetermined second section.

The control unit may adjust the reclining angle of the passenger seat based on the detected rotation angle of the rear-seat leg support when the operation instruction to operate the passenger seat is inputted.

Meanwhile, one or more embodiments of the present invention provide a method for controlling a rear-seat leg support which is performed by an apparatus for controlling the rear-seat leg support for a vehicle seat, the method including: receiving an inputted operation instruction to operate the rear-seat leg support from a user; operating the rear-seat leg support in accordance with the inputted operation instruction; detecting a rotation angle and a slide position of the operated rear-seat leg support; and adjusting a slide position of the rear-seat leg support based on the detected rotation angle of the rear-seat leg support.

The adjusting of the slide position of the rear-seat leg support may operate the slide position of the rear-seat leg support forward in a step-by-step manner when the detected rotation angle of the rear-seat leg support operates upward.

The adjusting of the slide position of the rear-seat leg support may individually operate an upward rotational operation and the slide operation of the rear-seat leg support when the detected rotation angle of the rear-seat leg support operates upward, and the adjusting of the slide position of the rear-seat leg support may operate a rearward slide operation in accordance with a predetermined floor interference condition when the detected rotation angle of the rear-seat leg support operates downward.

The method may further include: checking whether the detected position of a passenger seat is within a predetermined first section or a predetermined second section; adjusting the rotation angle of the rear-seat leg support based on a detected reclining angle of the passenger seat when the detected position of the passenger seat is within the predetermined first section; and performing the rotational operation of the rear-seat leg support in accordance with the inputted operation instruction when the detected position of the passenger seat is within the predetermined second section.

The method may further include: receiving an inputted operation instruction to operate the passenger seat; operating the passenger seat in accordance with the inputted operation instruction; detecting a slide position and a reclining angle of the passenger seat; and adjusting the detected reclining angle of the passenger seat based on the detected rotation angle of the rear-seat leg support.

According to one or more embodiments of the present invention, it is possible to prevent damage to the rear-seat leg support caused by a user's carelessness by avoiding interference between the vehicle floor or the passenger seat and the rear-seat leg support installed on the rear seat in the vehicle.

DESCRIPTION OF REFERENCE NUMERALS

101: Seat
200: Rear-seat leg support control apparatus
210: Input unit
220: Control unit
230: Drive unit
231, 232, 233, and 234: First drive unit, second drive unit, third drive unit, and fourth drive unit
240: Sensor unit
241: Position sensor
250: Rear-seat leg support
251: Up-down unit
252: First slide unit
260: Passenger seat
261: Recliner
262: Second slide unit

DETAILED DESCRIPTION

Hereinafter, embodiments of the present invention will be described with reference to the accompanying drawings. Embodiments of the present invention will be described in detail, focusing on parts necessary for understanding operations and actions according to one or more embodiments of the present invention. In the description of embodiments, descriptions of technical contents, which are well known in the technical field to which the present invention pertains and are not directly relevant to the present invention, will be omitted. The reason is to more clearly provide the subject matter of the present invention without obscuring the subject matter by omitting the unnecessary description.

In addition, in the description of constituent elements of one or more embodiments of the present invention, different reference numerals may denote constituent elements having the same name in accordance with the drawings, and the same reference numeral may denote constituent elements even though the constituent elements are illustrated in the different drawings. However, this case does not mean that the corresponding constituent elements have different functions in accordance with embodiments or have the same functions in different embodiments. The functions of the respective constituent elements should be determined based on the description of the respective constituent elements according to embodiments.

Figure 1:
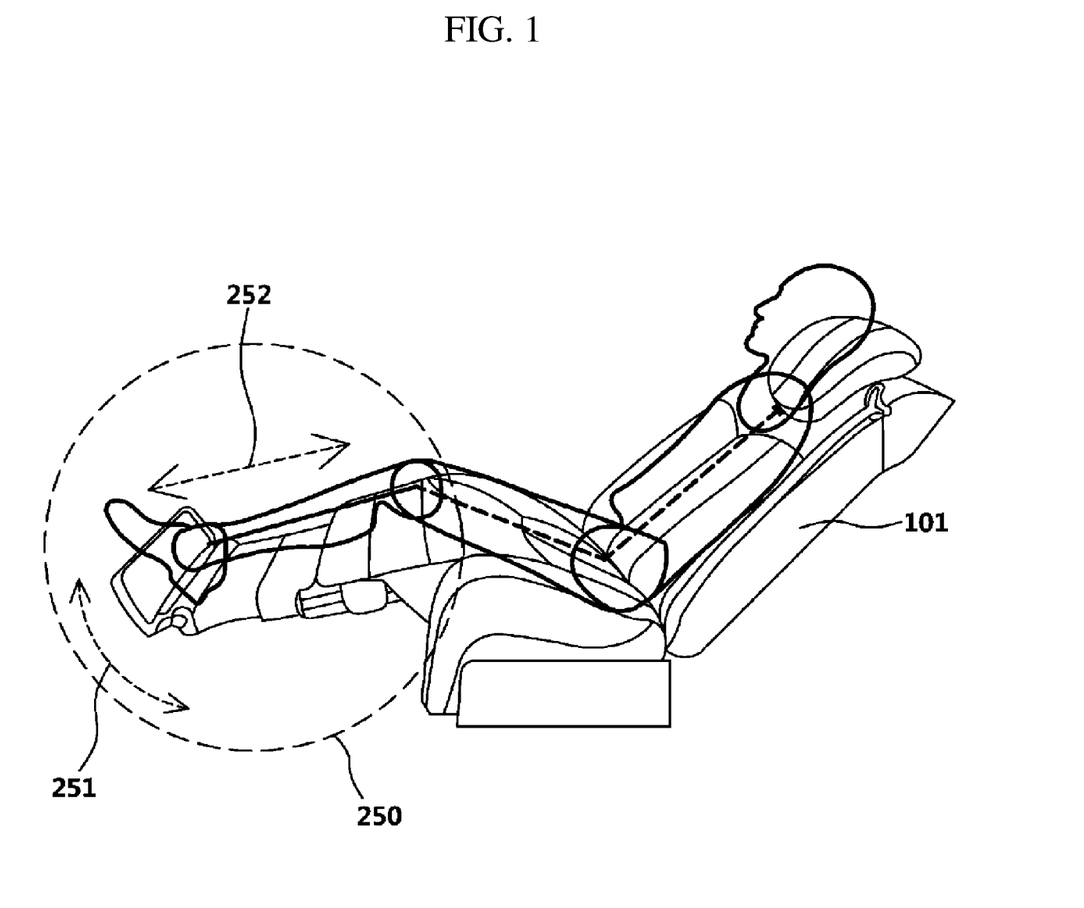
FIG. 1 is an explanatory view illustrating an operation of a rear-seat leg support positioned in a vehicle according to one or more embodiments of the present invention.

FIG. 1 is an explanatory view illustrating an operation of a rear-seat leg support positioned in a vehicle according to one or more embodiments of the present invention.

As illustrated in FIG. 1, a rear seat is positioned in a vehicle according to one or more embodiments of the present invention. A rear-seat leg support 250 is positioned at a lower end of the rear seat.

The rear-seat leg support 250 includes an up-down unit 251 and a first slide unit 252. Here, the up-down unit 251 performs an upward-downward rotational operation. In addition, the first slide unit 252 performs a forward-rearward slide operation.

Figure 2:
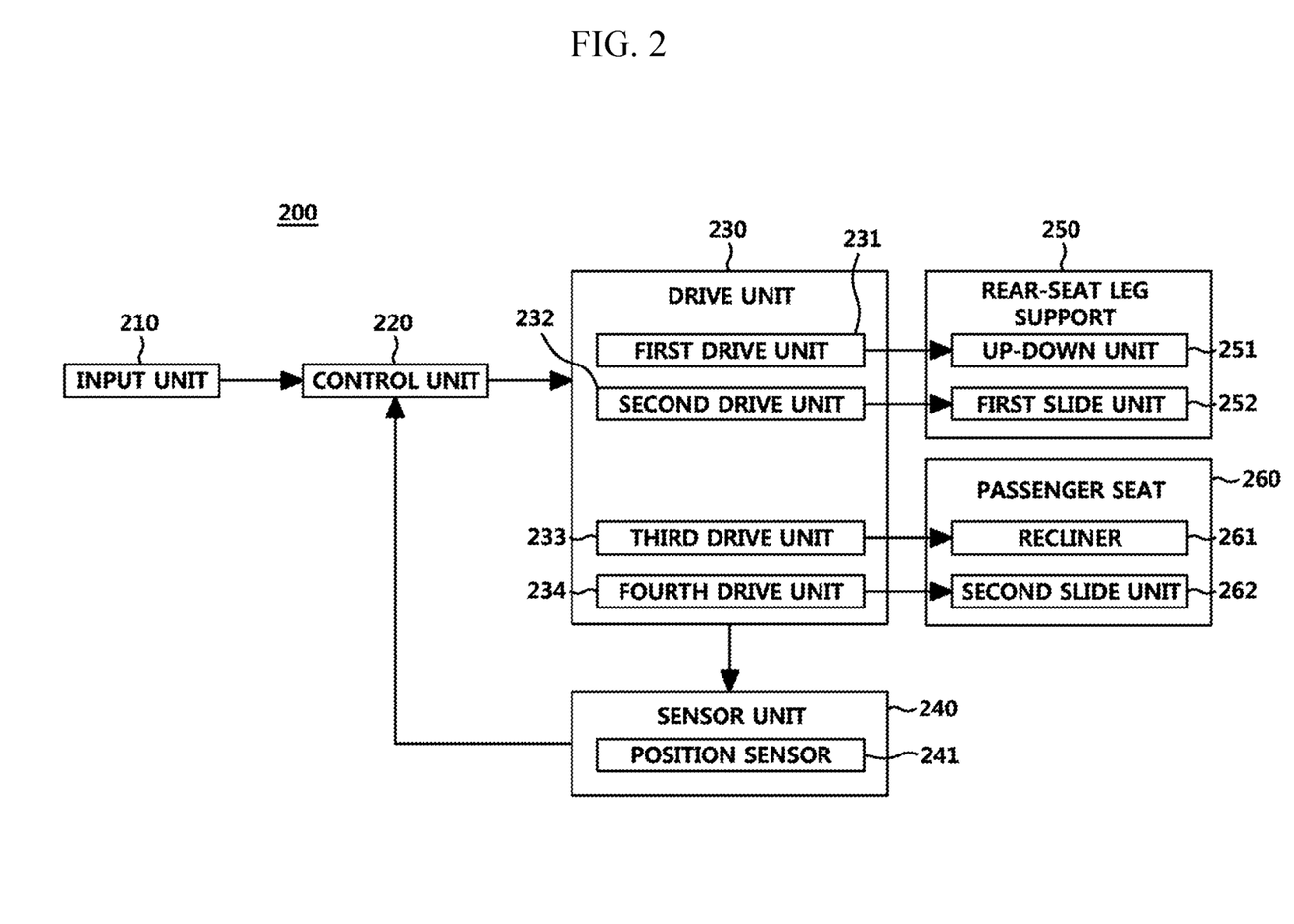
FIG. 2 is a configuration view of an apparatus for controlling a rear-seat leg support for a vehicle seat according to one or more embodiments of the present invention.

FIG. 2 is a configuration view of an apparatus for controlling the rear-seat leg support for a vehicle seat according to one or more embodiments of the present invention.

As illustrated in FIG. 2, a rear-seat leg support control apparatus 200 for a vehicle seat according to one or more embodiments of the present invention includes an input unit 210, a control unit 220, a drive unit 230, a sensor unit 240, the rear-seat leg support 250, and a passenger seat 260.

Hereinafter, specific configurations and operations of constituent elements of the rear-seat leg support control apparatus 200 for a vehicle seat in FIG. 2 will be described.

The rear-seat leg support 250 is provided at a lower side of the vehicle seat and performs the upward-downward rotational operation and the forward-rearward slide operation. Here, the rear-seat leg support 250 includes the up-down unit 251 which performs the upward-downward operation, and the first slide unit 252 which performs the forward-rearward slide operation.

The passenger seat 260 includes a second slide unit 262 which performs a forward-rearward slide operation, and a recliner 261 which performs a forward-rearward reclining operation.

Here, the passenger seat 260 is moved forward or rearward by an operation of the second slide unit 262 or rotated forward or rearward by an operation of the recliner 261. The recliner 261 is mounted at a joint portion between a seatback and a seat cushion of the passenger seat 260, and a rotation angle of the seatback of the passenger seat in a front and rear direction may be adjusted with respect to the seat cushion by the operation of the recliner 261.

The input unit 210 receives an inputted operation instruction to operate the rear-seat leg support 250 or the passenger seat 260 from a user.

The drive unit 230 operates the rear-seat leg support 250 and the passenger seat 260.

Here, the drive unit 230 includes first to fourth drive units 231 to 234.

The first drive unit 231 is connected to the up-down unit 251 of the rear-seat leg support 250 and operates to move the rear-seat leg support 250 to an upper end or a lower end.

The second drive unit 232 is connected to the first slide unit 252 of the rear-seat leg support 250 and operates to move the first slide unit 252 forward or rearward.

The third drive unit 233 is connected to the recliner 261 of the passenger seat 260 and operates to rotate the recliner 261 forward or rearward.

The fourth drive unit 234 is connected to the second slide unit 262 of the passenger seat 260 and operates to rotate the second slide unit 262 forward or rearward.

As described above, the first to fourth drive units 231 to 234 operate the up-down unit 251 and the first slide unit 252 of the rear-seat leg support 250 and the recliner 261 and the second slide unit 262 of the passenger seat 260.

The sensor unit 240 is connected to the drive unit 230 and detects a rotation angle and a slide position of the rear-seat leg support 250 or a slide position and a reclining angle of the passenger seat 260.

The sensor unit 240 may include a position sensor 241 that may detect the operation of each of the drive units 230 (e.g., a movement operation, a rotational operation, and the like) when a motor (not illustrated) provided in the drive unit 230 operates. Here, the position sensor 241 may be a Hall sensor.

The control unit 220 controls the drive unit 230 based on the inputted operation instruction, and adjusts the slide position of the rear-seat leg support 250 based on a rotation angle of the rear-seat leg support 250 which is detected by the sensor unit 240. Here, the control unit 220 may be a micro controller unit (MCU) that may perform calculation.

The control unit 220 may operate the slide position of the rear-seat leg support 250 forward in a step-by-step manner when the rotation angle of the rear-seat leg support 250 detected by the sensor unit 240 operates upward.

Meanwhile, the operations of the respective constituent elements of the rear-seat leg support control apparatus 200 will be described.

First, a leg support manual operation (floor interference avoidance condition) will be described.

Regarding a specific operating method, when the user manually operates the rear-seat leg support 250, the control unit 220 determines a slide amount of the rear-seat leg support 250 in accordance with the upward angle of the rear-seat leg support 250. The floor interference condition is shown in the following Table 1.

TABLE 1

| | UP-DOWN | | |
|---|---|---|---|
| Order | Based on angle | Based on motor screw | Slide |
| 1 | UP ≤ 30 | UP ≤ 20 mm | Stop |
| 2 | 30 < UP ≤ 45 | 20 < UP ≤ 30 mm | 0 to 30 mm |
| 3 | 45 < UP ≤ 60 | 30 < UP ≤ 40 mm | 0 to 60 mm |
| 4 | 60 > UP | 40 > UP | 0 to 95 mm (Full) |

As shown in Table 1, the control unit 220 may adjust the slide operation of the rear-seat leg support 250 only when the upward angle of the rear-seat leg support 250 is 30 degrees in an up state.

Further, after the upward angle of the rear-seat leg support 250 is 60 degrees in the up state, the control unit 220 may adjust the slide operation of the leg support throughout the entire section.

In a range in which the upward angle of the rear-seat leg support 250 is 30 to 60 degrees in the up state, the control unit 220 may adjust the slide operation of the rear-seat leg support 250 based on the floor interference condition as shown in Table 1.

Here, when the rotation angle of the rear-seat leg support 250 detected by the sensor unit 240 operates upward, the control unit 220 individually operates an upward rotational operation and a slide operation of the rear-seat leg support 250.

In addition, when the rotation angle of the rear-seat leg support 250 detected by the sensor unit 240 operates downward, the control unit 220 operates a rearward slide operation in accordance with the predetermined bottom (floor) interference condition.

Specifically, first, when a motor screw in a downward condition is in a condition of 40 mm or less (≤) condition, the control unit 220 moves a slider rearward to 60 mm.

Second, the motor screw in the downward condition is in a condition of 30 mm or less (≤) condition, the control unit 220 moves the slider rearward to 30 mm.

Third, the motor screw in the downward condition is in a condition of 20 mm or less (≤) condition, the control unit 220 moves the slider rearward to 0 mm.

Here, the downward and slide operations start simultaneously when the floor interference condition is entered, but points in time at which the downward and slide operations are finished may be different from each other. However, when an input of a switch provided in the input unit 210 is stopped, the operation is stopped at that point. Next, a leg support manual operation (passenger seat interference avoidance condition) will be described.

When the user manually operates the rear-seat leg support 250, the control unit 220 determines an up-down amount of the rear-seat leg support 250 in accordance with the position of the passenger seat.

Here, when the position of the passenger seat 260 detected by the sensor unit 240 is within a predetermined first section, the control unit 220 adjusts the rotation angle of the rear-seat leg support 250 based on a reclining angle of the passenger seat detected by the sensor unit 240. As an example, as shown in the following Table 2, when the position of the passenger seat is within a section of 160 to 260 mm, the control unit 220 may adjust the rotation angle of the rear-seat leg support 250 based on the reclining angle of the passenger seat detected by the sensor unit 240.

TABLE 2

| | Passenger seat | UP-DOWN | |
|---|---|---|---|
| Order | Reclining | Based on angle | Based on motor screw |
| 1 | 0° ≤ R ≤ 8° | UP ≤ 30° | UP ≤ 20 mm |
| 2 | 8° < R ≤ 16° | UP ≤ 45° | UP ≤ 30 mm |
| 3 | 16°° < R ≤ 24° | UP ≤ 60° | UP ≤ 40 mm |
| 4 | R > 24° | UP > 60° | UP > 40 mm |

As shown in Table 1, first, when the reclining angle of the passenger seat is 0°≤R≤8° ° from a rear side, the control unit 220 may adjust the rotation angle of the rear-seat leg support 250 within a range of UP≤20 mm based on the motor screw.

Second, when the reclining angle of the passenger seat is 8°<R≤16° from the rear side, the control unit 220 may adjust the rotation angle of the rear-seat leg support 250 within a range of UP≤30 mm based on the motor screw.

Third, when the reclining angle of the passenger seat is 16°<R≤24° from the rear side, the control unit 220 may adjust the rotation angle of the rear-seat leg support 250 within a range of UP≤40 mm based on the motor screw.

Fourth, when the reclining angle of the passenger seat is R>24° from the rear side, the control unit 220 may operate the rotation angle of the rear-seat leg support 250 throughout the entire up-down section based on the motor screw.

Meanwhile, when the position of the passenger seat 260 detected by the sensor unit 240 is within a predetermined second section, the control unit 220 may perform the rotational operation of the rear-seat leg support 250 in accordance with the operation instruction inputted through the input unit 210. As an example, when the position of the passenger seat is within a section of 160 mm or less from the front side, the control unit 220 may operate the up-down operation of the rear-seat leg support 250 within the entire section. However, when the input of the switch is stopped, the operation is stopped at that point.

Next, a passenger seat manual operation will be described.

When the operation instruction to operate the passenger seat 260 is inputted, the control unit 220 may adjust the reclining angle of the passenger seat 260 based on the rotation angle of the rear-seat leg support 250 detected by the sensor unit 240.

In a case in which the rear-seat leg support 250 is directed upward during the passenger seat manual operation, sections within which the passenger seat may be positioned are determined in accordance with states of the rear-seat leg support 250.

As an example, in a case in which the rear-seat leg support 250 is unfolded when the position of the passenger seat approaches a section of 160 to 260 mm from the front side, the control unit 220 may adjust the reclining angle of the passenger seat, as shown in the following Table 3.

TABLE 3

| Passenger seat | | UP-DOWN | |
|---|---|---|---|
| Order | Reclining | Based on angle | Based on motor screw |
| 1 | 0° ≤ R ≤ 8° | UP ≤ 30° | UP ≤ 20 mm |
| 2 | 8° < R ≤ 16° | UP ≤ 45° | UP ≤ 30 mm |
| 3 | 16° < R ≤ 24° | UP ≤ 60° | UP ≤ 40 mm |
| 4 | R > 24° | UP > 60° | UP > 40 mm |

As shown in Table 3, first, in a condition in which the rear-seat leg support 250 is UP>40 mm, the control unit 220 may adjust the reclining angle of the passenger seat 260 within a range of R>24°.

Second, in a condition in which the rear-seat leg support 250 is 30<UP≤40 mm, the control unit 220 may adjust the reclining angle of the passenger seat 260 within a range of R>16°.

Third, in a condition in which the rear-seat leg support 250 is 20<UP≤30 mm, the control unit 220 may adjust the reclining angle of the passenger seat 260 within a range of R>8°.

Fourth, in a condition in which the rear-seat leg support 250 is UP≤20 mm, the control unit 220 may adjust the reclining angle of the passenger seat 260 throughout the entire range.

Here, when the rear-seat leg support 250 and the passenger seat 260 reach an interference section during the passenger seat manual operation, the operation is stopped at that point.

Figure 3:
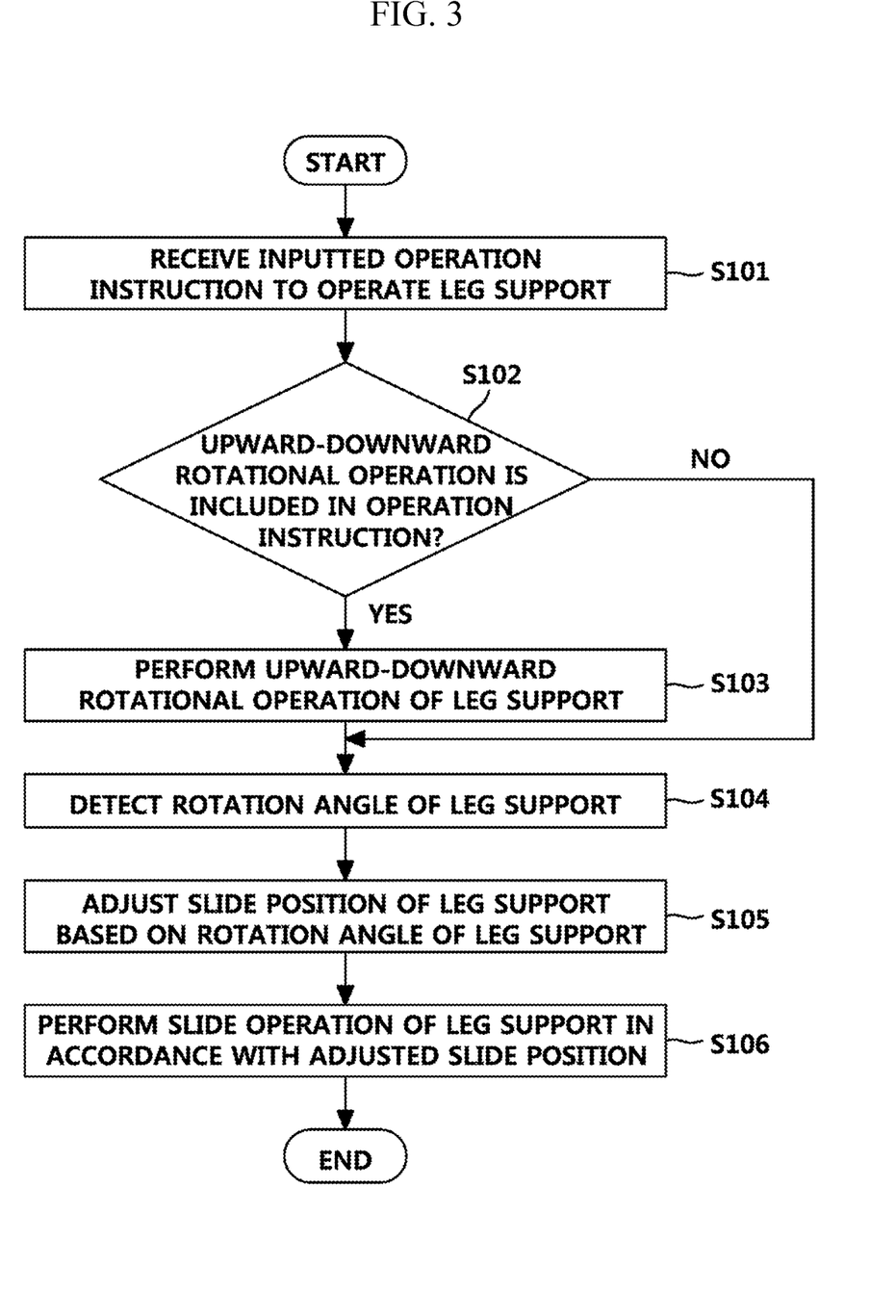
FIG. 3 is a flowchart illustrating a method for controlling the rear-seat leg support in consideration of a floor interference avoidance condition according to one or more embodiments of the present invention.

FIG. 3 is a flowchart illustrating a method for controlling the rear-seat leg support in consideration of the floor interference avoidance condition according to one or more embodiments of the present invention.

As illustrated in FIG. 3, the rear-seat leg support control apparatus 200 receives an inputted operation instruction to operate the rear-seat leg support 250 (S101).

Further, the rear-seat leg support control apparatus 200 checks whether the upward-downward rotational operation is included in the inputted operation instruction to operate the rear-seat leg support 250 (S102).

As a result of the check (S102), in a case in which the upward-downward rotational operation is included in the operation instruction to operate the rear-seat leg support 250, the rear-seat leg support control apparatus 200 performs the upward-downward rotational operation of the rear-seat leg support 250 (S103).

Further, the rear-seat leg support control apparatus 200 detects the rotation angle of the rear-seat leg support 250 (S104).

Next, the rear-seat leg support control apparatus 200 adjusts the slide position of the rear-seat leg support 250 based on the rotation angle of the rear-seat leg support 250 (S105).

Thereafter, the rear-seat leg support control apparatus 200 performs the slide operation of the rear-seat leg support 250 in accordance with the adjusted slide position (S106).

Meanwhile, as a result of the check (S102), in a case in which the upward-downward rotational operation is not included in the operation instruction to operate the rear-seat leg support 250, the rear-seat leg support control apparatus 200 performs process S103 instead of performing the upward-downward rotational operation of the rear-seat leg support 250.

Figure 4:
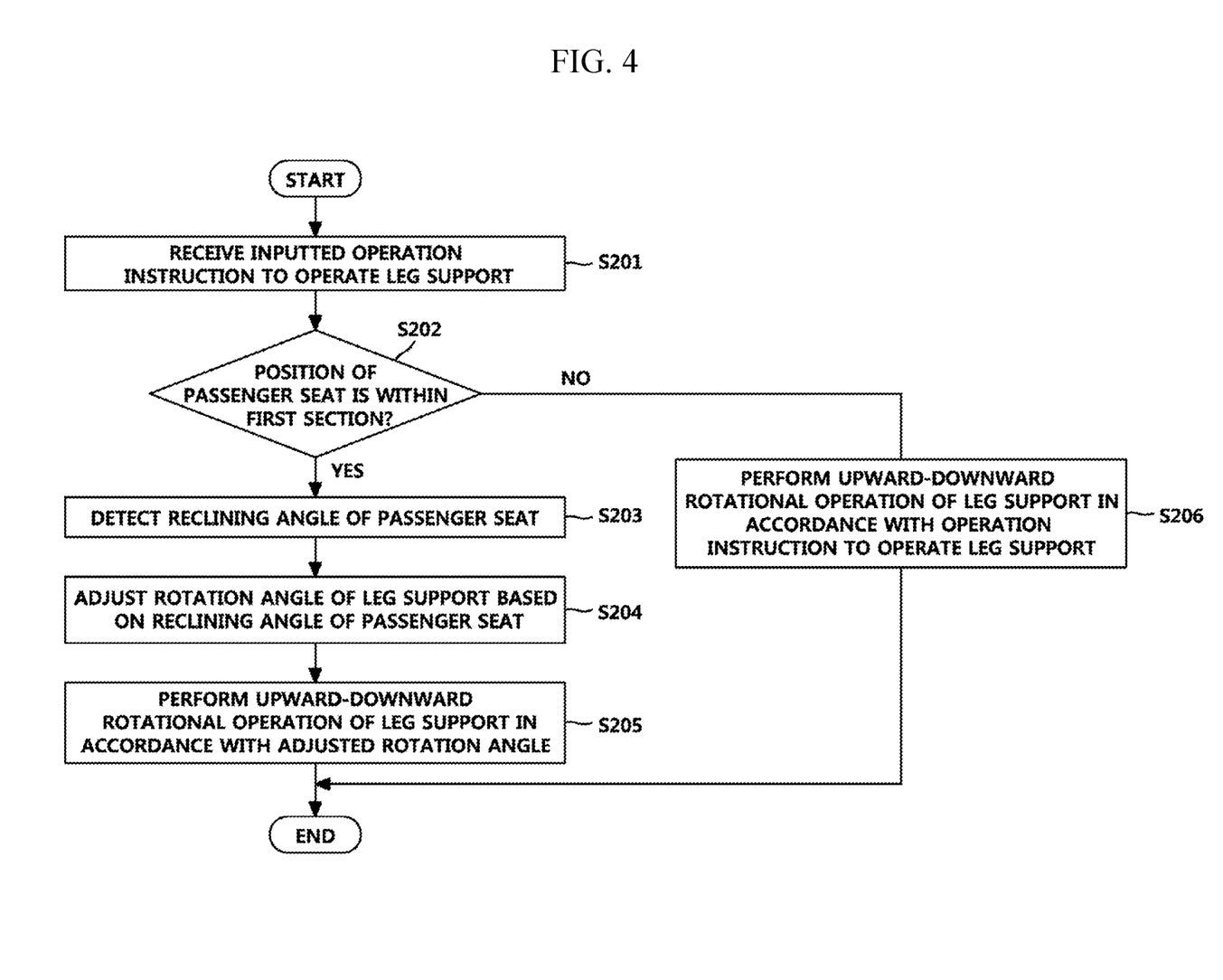
FIG. 4 is a flowchart illustrating a method for controlling the rear-seat leg support in consideration of a passenger seat interference avoidance condition according to one or more embodiments of the present invention.

FIG. 4 is a flowchart illustrating a method for controlling the rear-seat leg support in consideration of the passenger seat interference avoidance condition according to one or more embodiments of the present invention.

The rear-seat leg support control apparatus 200 receives an inputted operation instruction to operate the rear-seat leg support 250 (S201).

The rear-seat leg support control apparatus 200 checks whether the position of the passenger seat is within the first section (S202).

As a result of the check (S202), in a case in which the position of the passenger seat is within the first section, the rear-seat leg support control apparatus 200 detects the reclining angle of the passenger seat (S203).

Further, the rear-seat leg support control apparatus 200 adjusts the rotation angle of the rear-seat leg support 250 based on the reclining angle of the passenger seat (S204).

Next, the rear-seat leg support control apparatus 200 performs the upward-downward rotational operation of the rear-seat leg support 250 in accordance with the adjusted rotation angle (S205).

Meanwhile, as a result of the check (S202), in a case in which the position of the passenger seat is not within the first section, the rear-seat leg support control apparatus 200 performs the upward-downward rotational operation of the rear-seat leg support 250 in accordance with the operation instruction to operate the rear-seat leg support 250 (S206).

Figure 5:
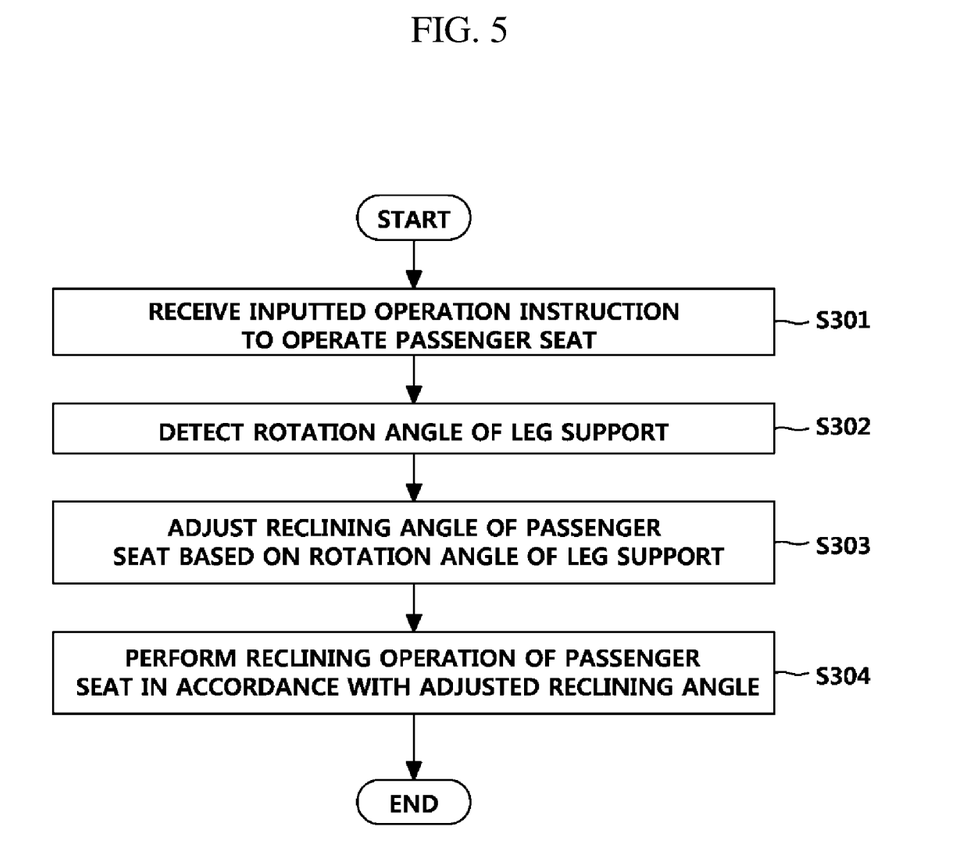
FIG. 5 is a flowchart illustrating a method for controlling the rear-seat leg support during a passenger seat manual operation according to one or more embodiments of the present invention.

FIG. 5 is a flowchart illustrating a method for controlling the rear-seat leg support during the passenger seat manual operation according to one or more embodiments of the present invention.

The rear-seat leg support control apparatus 200 receives an inputted operation instruction to operate the passenger seat (S301).

The rear-seat leg support control apparatus 200 detects the rotation angle of the rear-seat leg support 250 (S302).

The rear-seat leg support control apparatus 200 adjusts the reclining angle of the passenger seat based on the rotation angle of the rear-seat leg support 250 (S303).

The rear-seat leg support control apparatus 200 performs the reclining operation of the passenger seat in accordance with the adjusted reclining angle (S304).

The previously-described embodiments are just illustrative, and various modifications and alterations may be made by those skilled in the art to which the present invention pertains without departing from the essential features of the present invention. Therefore, the previously-described embodiments of the present invention are provided for illustrative purposes only but not intended to limit the technical concept of the present invention. The scope of the technical concept of the present invention is not limited thereto. The protective scope of the present invention should be construed based on the following claims, and all the technical spirit in the equivalent scope thereto should be construed as falling within the scope of the present invention.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. An apparatus for controlling a rear-seat leg support for a vehicle seat, the apparatus comprising:
   a rear-seat leg support disposed at a lower side of the vehicle seat and that performs an upward-downward rotational operation and a forward-rearward slide operation;
   a passenger seat that performs a forward-rearward slide operation and a forward-rearward reclining operation;
   a drive unit that operates each of the rear-seat leg support and the passenger seat;
   a sensor unit connected to the drive unit and that detects a rotation angle and a slide position of the rear-seat leg support or a slide position and a reclining angle of the passenger seat;
   an input unit that receives an inputted operation instruction to operate the rear-seat leg support or the passenger seat from a user; and
   a control unit that controls the drive unit in accordance with the inputted operation instruction and adjusts the slide position of the rear-seat leg support based on the detected rotation angle of the rear-seat leg support,
   wherein the control unit individually performs an upward rotational operation and a slide operation of the rear-seat leg support when the detected rotation angle of the rear-seat leg support shows an upward operation of the rear-seat leg support, and the control unit performs a rearward slide operation of the rear-seat leg support in accordance with a predetermined floor interference condition when the detected rotation angle of the rear-seat leg support shows a downward operation of the rear-seat leg support,
   wherein the control unit adjusts the slide position of the rear-seat leg support forward in a step-by-step manner when the detected rotation angle of the rear-seat leg support shows the upward operation,
   wherein the control unit adjusts the rotation angle of the rear-seat leg support based on the detected reclining angle of the passenger seat when a detected position of the passenger seat is within a predetermined first section, and the control unit performs a rotational operation of the rear-seat leg support in accordance with the inputted operation instruction when the detected position of the passenger seat is within a predetermined second section, and
   wherein, in the predetermined floor interference condition, the control unit adjusts the slide position of the rear-seat leg support only when an upward angle of the rear-seat leg support is 30 degrees in an up state, and
   wherein, in a passenger seat interference avoidance condition, when the position of the passenger seat is within the predetermined first section of 160 to 260 mm, the rotation angle of the rear-seat leg support is adjusted based on the reclining angle of the passenger seat, and when the position of the passenger seat is within the predetermined second section of 160 mm or less, the control unit performs an up-down operation of the rear-seat leg support within an entire section of the passenger seat.

2. The apparatus according to claim 1, wherein the control unit adjusts the reclining angle of the passenger seat based on the detected rotation angle of the rear-seat leg support when the operation instruction to operate the passenger seat is inputted.

3. A method for controlling a rear-seat leg support performed by an apparatus for controlling the rear-seat leg support for a vehicle seat, the method comprising:
   receiving an inputted operation instruction to operate the rear-seat leg support from a user;
   operating the rear-seat leg support in accordance with the inputted operation instruction;
   detecting a rotation angle and a slide position of the operated rear-seat leg support;
   adjusting a slide position of the rear-seat leg support based on the detected rotation angle of the rear-seat leg support;
   checking whether a detected position of a passenger seat is within a predetermined first section or a predetermined second section;
   adjusting the rotation angle of the rear-seat leg support based on a detected reclining angle of the passenger seat when the detected position of the passenger seat is within the predetermined first section; and
   performing a rotational operation of the rear-seat leg support in accordance with the inputted operation instruction when the detected position of the passenger seat is within the predetermined second section,
   wherein the slide position of the rear-seat leg support is adjusted by individually performing an upward rotational operation and a slide operation of the rear-seat leg support when the detected rotation angle of the rear-seat leg support shows an upward operation of the rear-seat leg support, and the slide position of the rear-seat leg support is adjusted by performing a rearward slide operation in accordance with a predetermined floor interference condition when the detected rotation angle of the rear-seat leg support shows a downward operation of the rear-seat leg support, and
   wherein, in the predetermined floor interference condition, the slide position of the rear-seat leg support is adjusted only when an upward angle of the rear-seat leg support is 30 degrees in an up state, and
   wherein, in a passenger seat interference avoidance condition, when the position of the passenger seat is within the predetermined first section of 160 to 260 mm, the rotation angle of the rear-seat leg support is adjusted based on the reclining angle of the passenger seat, and when the position of the passenger seat is within the predetermined second section of 160 mm or less, an up-down operation of the rear-seat leg support is performed within an entire section of the passenger seat.

4. The method according to claim 3, wherein the slide position of the rear-seat leg support is adjusted forward in a step-by-step manner when the detected rotation angle of the rear-seat leg support operates upward.

5. The method according to claim 3, further comprising:
receiving an inputted operation instruction to operate a passenger seat;
operating the passenger seat in accordance with the operation instruction on the passenger seat;
detecting a slide position and a reclining angle of the passenger seat; and
adjusting the detected reclining angle of the passenger seat based on the detected rotation angle of the rear-seat leg support.

* * * * *